OPTICAL SYSTEM FOR COLOR TELEVISION RECEIVER

Filed Aug. 28, 1951 3 Sheets-Sheet 1

INVENTOR.
Walter C. Howey
BY Ezekiel Wolf
his Attorney

Aug. 28, 1956 W. C. HOWEY 2,761,008

OPTICAL SYSTEM FOR COLOR TELEVISION RECEIVER

Filed Aug. 28, 1951 3 Sheets-Sheet 2

INVENTOR.
Walter C. Howey
BY Ezekiel Wolf
his Attorney

Aug. 28, 1956 W. C. HOWEY 2,761,008

OPTICAL SYSTEM FOR COLOR TELEVISION RECEIVER

Filed Aug. 28, 1951 3 Sheets-Sheet 3

INVENTOR.
Walter C. Howey
BY
Ezekiel Wolf
his Attorney

United States Patent Office 2,761,008

Patented Aug. 28, 1956

2,761,008

OPTICAL SYSTEM FOR COLOR TELEVISION RECEIVER

Walter C. Howey, Boston, Mass.

Application August 28, 1951, Serial No. 244,039

6 Claims. (Cl. 178—5.4)

This invention relates to color television and also to the conversion of monochromatic television receivers so that they may receive either monochromatic or color television.

Monochromatic television is often referred to as black and white television though the contrast may be in any one color, usually dependent upon the coating on the television tube. In the present standards adopted black and white television which will be the name used for a single color has been transmitted with a horizontal sweep frequency of 15.75 kilocycles and a vertical sweep of 60 cycles per second, while color television pictures are transmitted at a horizontal sweep frequency of 29.16 kilocycles and a vertical sweep frequency of 144 cycles.

It has been recognized that both horizontal and vertical sweep frequencies should be increased for television when transmitting and receiving color over that when white and black are transmitted and received, but such conversion has been found difficult, clumsy and expensive in the system which has been approved by the Federal Communications Commission.

One of the purposes of this invention is to modify black an white television receivers whereby they may automatically receive either black and white or color television.

Another purpose of this invention is a simple and inexpensive means of converting the twelve or more million existing television receivers to an automatically compatible system of monochromatic or tricolor television reception within a 6 megacycle band width as approved by the Federal Communications Commission, September 1, 1950 and by the Supreme Court of the United States.

Another purpose is to make all operation of an automatically compatible television reception converter controlled in synchronism, phase and color by transmitted signals to which the receiver may be tuned.

Another purpose is a television projection conversion means which increases the brilliance, fidelity, visibility and size of color television pictures that may be had with existing receivers.

Another purpose is to increase image transmission as much as 99.6 per cent by coating inhibiting reflections applied to translucent elements of the conversion system at specific points such as on the glass face of a television projection tube and on a tricolor red, green and blue rotary color filter. The filter is rotated between coated lenses within the barrel of a lenticular projector, greatly reducing reflection distortion.

Another purpose of this invention is a television receiver conversion means in which the color conversion of a projected television image is made in a position where the image is of comparatively small size and great brilliance. This takes place within the lens barrel of a lenticular projector adjacent the cross over vertex of images inverted by the system. At this place in the system the image has been condensed to a smaller area than at its normally viewed position and is greatly increased in brilliance. The system uses a miniature wafer filter having a rotating tricolor or multicolor ring, segments or annuli. Filter speed is governed in phase and synchronism by the tuned transmitted signal so that any variation in signal frequency controls both the vertical sweep frequency of the cathode ray television tube and the timed rotation of the filter. Small area coloring of the television image enhances brilliance, fidelity and visibility of reception.

Another purpose is a conversion system for existing monochromatic television receivers which disposes of the single objection raised by the chairman of the Federal Communications Commission to the presently adopted system, which is that a tricolor wheel as used, must be double the area of a television tube so that the size of pictures receivable in home receivers may be limited to 12-inch tubes using 26-inch tricolor filters or something of such size. By my conversion method, I have projected color television pictures 200 times larger than the face of the television tube or the received television images or the rotary color filter. A very small rotary color filter may be used with a picture of any desired size.

Another purpose is a conversion system using a miniature 144-cycle motor having the unique property of instant synchronization to any variance in frequency of the transmitted color television signal which controls it. If the signal transmits color pictures the signal starts the motor, shifts it to tint the projected picture within the lens barrel and combines synchronization of and phase with that of the electron beam tracing the image on the cathode ray tube face.

If the transmitted signal is changed to black and white, the transmitted signal stops the motor, shifts the color wheel out of the lens barrel. Irrespective of load or friction this motor will run either in synchronism with the transmitted signals or it will not run at all. Conventional huge laminated color wheels, driven by fractional horsepower mains driven motors such as 60 cycle A. C. require frequent manual shift and adjustment and may vary both in synchronism and phase. My motor and filter require no manual adjustment or manual shift.

Without further describing the merits and advantages of the present invention, the invention will be described in the specification below with the aid of the drawings illustrating an embodiment of the same, in which.

Figure 2:
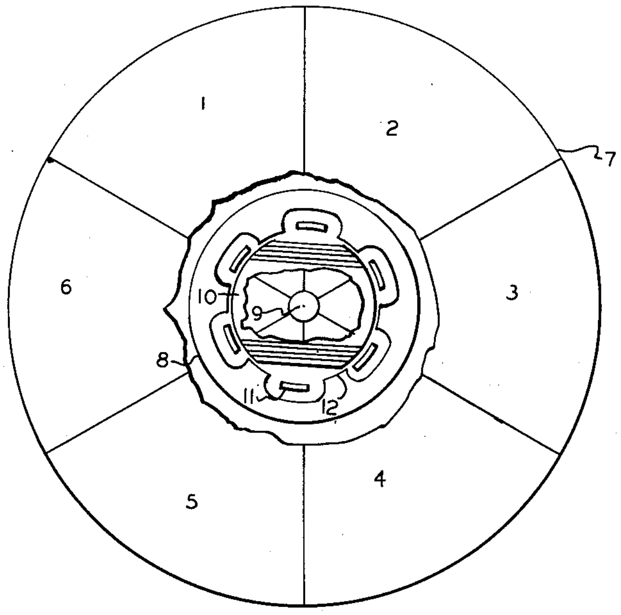
Figure 2 shows in plan view a detail of the color wheel and driving motor of Figure 1.

Either black or white or color television signals are received at antenna 23 tuned and amplified by radio frequency stages 24, then impressed upon the intermediate frequency converter, amplifier and detector 25 and passed to video amplifier 26. Video amplifier 26 then modulates cathode ray picture 16 while supplying synchronizing pulse separator 27 with signals. The horizontal synchronizing signals are applied to the horizontal oscillator and amplifier 28 which actuates the horizontal deflection coils of deflection yoke 29.

The vertical synchronizing signals from synchronizing pulse separator 27 are applied to vertical oscillator and amplifier 30 and hence to the vertical deflection coils of yoke 29. Horizontal synchronizing signal for synchronizing pulse separator 27 are also applied to tuned circuit 31. Circuit 31 is tuned to resonance at the horizontal synchronizing signal frequency used for color television, therefore voltage appears across it when color television is being received. This voltage is then amplified by signal amplifier 32 after which it is used to operate control tube 33 which actuates relay 34 closing contacts 35, 36, 37 and 38. Contact 35 changes the time constants of the vertical sweep oscillator and amplifier 30 so as to allow it to operate in synchronism with the vertical scanning rate of the color television signal.

Contact 36 changes the time constants of the horizontal sweep oscillator and amplifier 28 so it will synchronize at the color television horizontal scanning rate.

Contact 37 closes the circuit so that the power amplifier 40 may apply power to vertical motor synchronizing signal which may be energized. This amplifier is connected through phasing switch 39 to the vertical synchronizing signal output of the synchronizing pulse separator 27. The amplified signal, at the color television vertical scanning rate from the output of amplifier 40 is used to drive synchronous motor 8 which revolves color wheel 7 in front of cathode ray picture tube 16, at the point where the image size is reduced by the lens.

Contact 38 completes the circuit through solenoid 22 and power source 41. Solenoid 22 when actuated pulls arm 18 causing it to turn on pivot 19. Moving member 18 carries motor 8 and therefore solenoid 22 will cause color wheel to move in front of cathode ray picture tube 16 producing color television pictures, as will be more fully explained below.

The motor power amplifier 40 amplifies the vertical color television synchronizing signal which is separated by the synchronizing separator circuit from the horizontal signal and transmitted over line 39′ through the relay switch 39 to it. The relay switch 39 is maintained closed by energization of the relay coil 31′ which is a part of the tuned capacitive inductive circuit 31 which is tuned to the horizontal signal of the separator 27, and becomes energized when color television is being received. This horizontal signal has been standardized at a frequency of 144 pulses per second.

A six pole pair synchronous motor 8 with armature 10 and stator poles 11 is so designed that its rotor to which the six segment color wheel is attached turns 1440 R. P. M. when the field has 144 C. P. S. alternating current flowing through it. The motor stator is, as mentioned, composed of six pole pairs and the rotor composed of two pairs of opposite poles. These rotor poles are so arranged as to allow the motor to run in synchronism within one half of a stator pole face. There are six segments to the color wheel which correspond to the six poles pairs of the stator. It follows then that the color wheel will synchronize within one quarter of a color wheel segment with the vertical field rate.

The present systems of field sequential color television is superior to other systems since none will follow changes in the vertical field rate as closely as the present system as they all rely on some sort of saturable reactor or electrical brake coupled with a tone generator and discriminator circuits to maintain synchronism which has no definite lock as in the present system.

Tuned relay system 31, 32, 33 is made up of a tuned capacitive inductance circuit 31, a dual triode amplifier 32 and 33 and a sensitive relay 34.

The horizontal synchronizing signals from the synchronizing signal are applied across the capacitively tuned inductance circuit 31.

The synchronizing signal is fed through an isolating resistance 50 to the tuned circuit 31 which is peaked or resonated at 29.16 kc. the color television horizontal scanning rate. Therefore a large voltage will only appear across this coil and be applied to the grid of the first triode amplifier at the color television horizontal scanning rate. Assuming a 29.16 kc. synchronizing signal is being received, a voltage then appears across the tuned circuit and is amplified by the first amplifier and applied to the second amplifier. The second amplifier serves two functions, it further amplifies the signal and changes it into a variation in the average value of plate current.

This second triode is so biased that a certain value of plate current will flow in the absence of A. C. grid voltage and so that plate current will decrease by a fixed amount when a certain minimum of A. C. grid voltage is reached as by the presence of the horizontal synchronizing color signal. The sensitive relay in the plate circuit of this triode has the property of closing on low values of D. C. current and is therefore normally closed when no A. C. gets to it, and opening on a small downward change of D. C. current which means that the horizontal synchronizing color signal will keep it open. Therefore when a 29.16 kc. synchronizing signal is received the relay 34 will open and thereby close the proper contacts 35, 36, 37 and 38 to switch all the necessary values of components so as to allow correct operation of all sweep circuits at the color T. V. standards. This relay also actuates the motor amplifier and solenoid 22 connected to the power supply 41 to move color wheel into the optical path of cathode ray picture tube.

Figures 1, 2, 3 and 4 show the arrangement of the conversion from monochromatic to color television at the receiver. A condensing lens assembly 15 is placed in front of the cathode ray picture tube 16 in such a way that the light rays as shown by the dotted lines 14 will strike fully within the lens assembly and be focussed at a point inside the lens assembly as indicated diagrammatically at 13. For this purpose the lens assembly 15 is split in two parts with a condensing or focussing section 60 and a projecting section 61 whose relative positions may be adjusted one to the other. Between these sections is an open space or slot 62 through which the color disc may be rotated in its own plane on the vertical shaft 9 of the synchronous motor 8 which has already been described.

The motor 8 is mounted on a bar or plate 18 (Figure 4) and pivoted by a pivoting shaft or rod 19 so that the motor assembly with the color wheel 7 may be moved into a slot 62 or out of the slot 62 in accordance with the operation of solenoid 22, the plunger 20 of which is linked to the plate or shaft 18 at the point 63 between the motor shaft 9 and the point of pivot 19 but much nearer the point of pivot 19.

A pair of leads 21 connect the solenoid into the operating circuit in series with the relay contacts 38 to which power is supplied through the source 41.

The color wheel 7 is provided with six segments, numbered 1 to 6 inclusive, all of the same size and corresponding to the transmitted signal and synchronized therewith.

Figure 1:
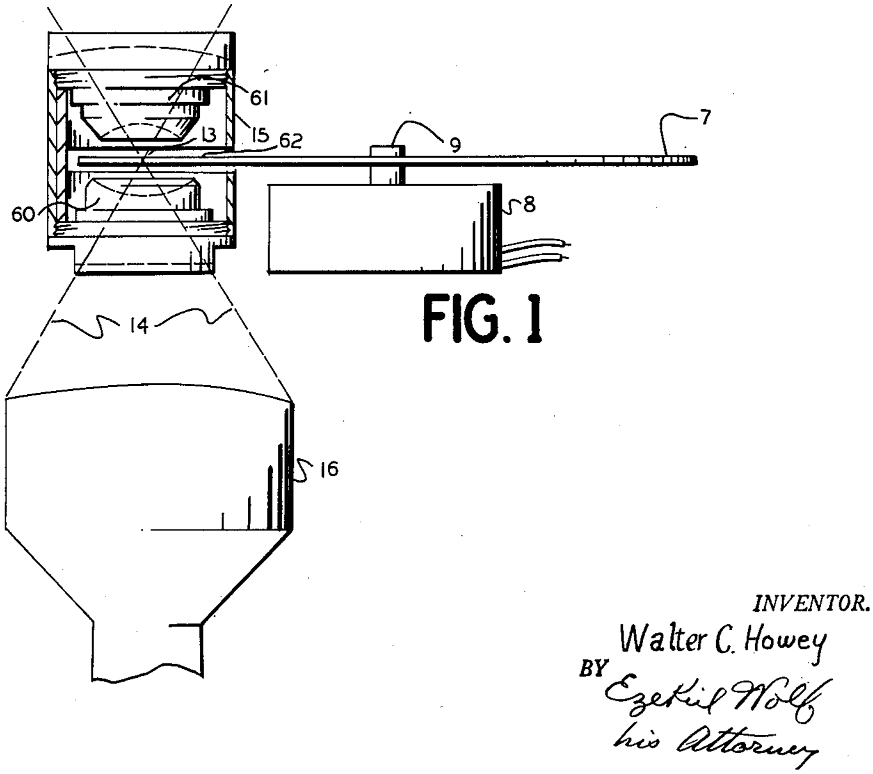
Figure 1 shows somewhat diagramatically in elevation a part of the system for producing monochromatic and color television.

These color segments need only be annular segments to cover the portion entering the slot 62, and further while in Figure 1, the wheel 7 passes approximately through the point of focus, this need not be in the exact focal center but the color filter may pass through the image when it is projected to a smaller area than the image formed on the face of the television tube.

Figures 3, 4:
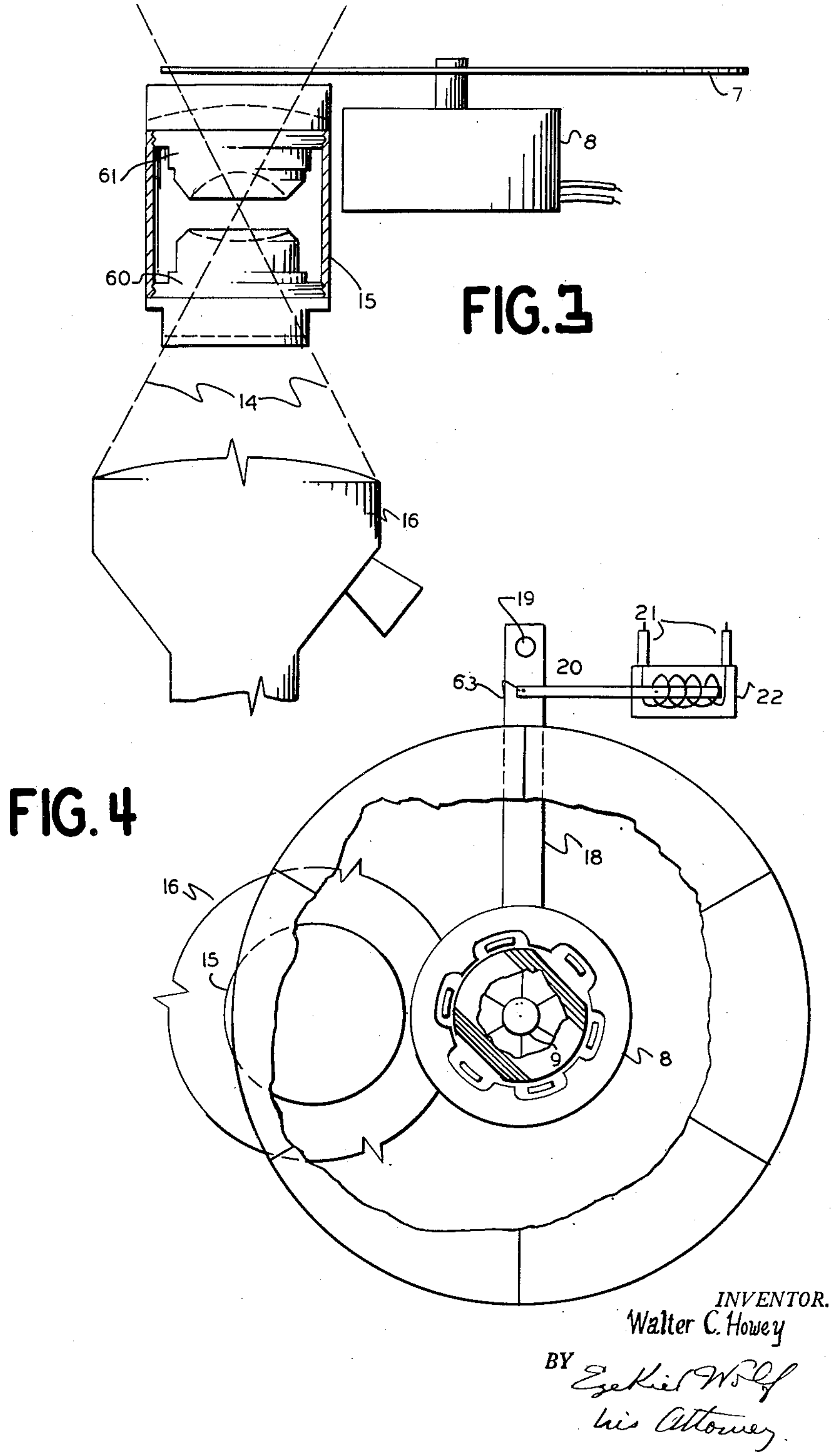
Figure 3 shows a modification of the arrangement of Figure 1.
Figure 4 shows somewhat diagrammatically in plan view a detail of shifting from monochromatic to color television and vice versa.
Figure 5:
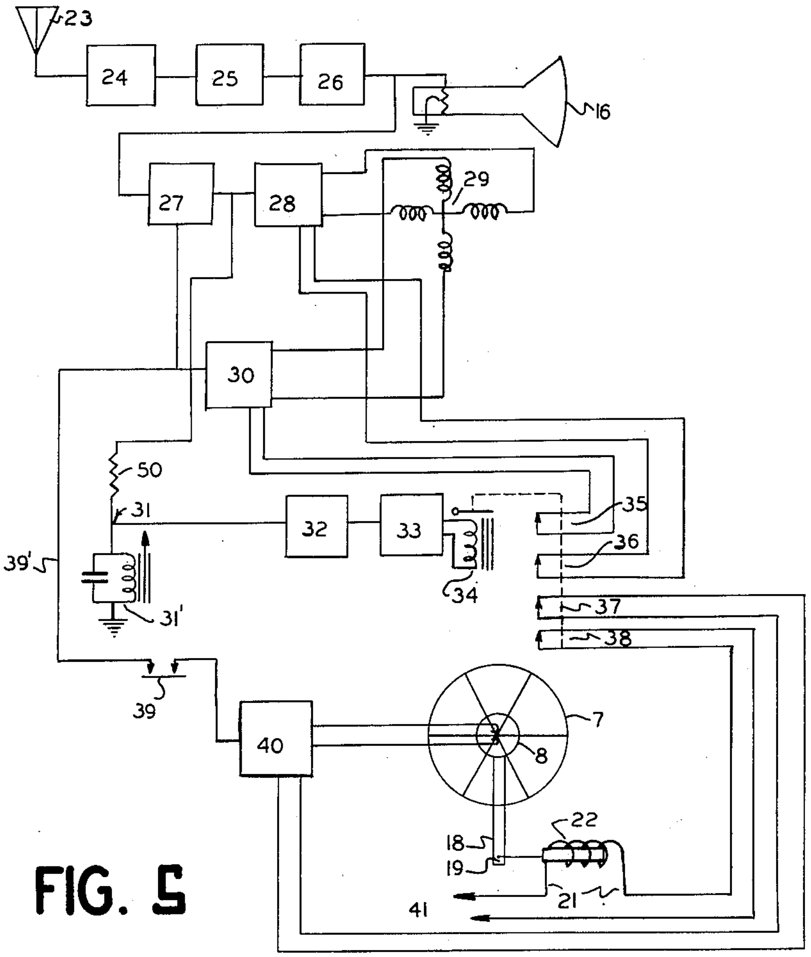
Figure 5 is a block diagram of a complete automatic system of the reception of monotone or three color television pictures.

An arrangement of this sort is shown in Figure 3 where the color wheel 7 passes in front of the lens assembly 15 over an area which is substantially smaller than the area of the face of the tube 16.

It is not necessary in the present application to curve the color sectors as shown in the prior systems because of the fact that the picture area through which the filter passes is very small.

In the present system when the set is operated under monochromatic transmission, the color wheel remains out of the slot 62 or away from the lens 15, so that the plain black and white pictures are transmitted.

When color television is being received, the signal pulse separator 27 which produces both horizontal and vertical synchronizing signals, will cause current to flow through the resonant circuit 31 which is tuned to the horizontal signal frequency. The coil 31' will therefore cause the relay contacts 39 to close, which completes the circuit to the amplifier 40 for amplifying the vertical frequency signal.

The horizontal frequency signal will pass through the amplifiers 32, 33 and operate the sensitive relay 34 to close the contacts 35, 36, 37 and 38 for converting the horizontal amplifier 28 and the vertical amplifier 30 for operating the sweep frequencies of the control elements 29 of the cathode tube 16 and at the same time operate the solenoid 22 for pulling the color wheel 7 into position in front of the cathode ray tube.

The system thereby operates automatically for producing color television.

When the signal is changed back again, the contacts 35, 36, 37 and 38, open, as well as the contact 39, restoring the system under normal inoperative condition for monochromatic color television.

The color wheel 7 should have on both faces, non-reflecting light transmitting film of less than a light wave length thick, or thin enough to avoid interference reflections.

The same type of coating should also be applied to the reflecting surfaces of the condensing and projecting lenses or sections facing the opposite faces of the color disc. While the face of the television tube may also be coated in a similar manner, this may be omitted if desired.

The present system may be used with a large diameter television tube, in which case the condensing lens section should have an enlarged object lens receiving a substantial part of all of the energy from the television tube.

The present system however is preferably operated with a smaller color television tube of the order of 2½" to 3", in which case the lens system may be of the same diameter or slightly less and the color wheel disc or filter in this case, as it may be called, need be no more than 4" in diameter. In either event the monochromatic or color television picture will pass through the condensing and enlarging lens, the only difference being that when color television is being shown, the color wheel will be rotated in-between the lens section as illustrated in Figure 1 or in front of the lens as indicated in Figure 3.

It may also be noted that the present arrangement of showing color television can also be used with the usual monochromatic television receiver.

In this case the unit having the color television system may be switched in circuit automatically as has been described and the monochromatic television cut out when the sending station starts to send color television, and similarly the system may be switched back again to monochromatic television when the station has ceased to send color television.

In such an arrangement the two tubes would be connected across the same lines with perhaps an additional automatic switch to apply the standard voltages necessary for operating each of the tubes.

Having now described my invention, I claim:

1. In a combination monochromatic and color television system, a cathode ray television tube, a condensing and projecting lens system positioned to condense the image appearing on the face of the tube and to enlarge the condensed image, a multicolor filter disc, means operative on the receipt of a color vision synchronizing signal for moving the disc to a position on said lens where the image from said television tube has an area substantially smaller than on the face of the television tube, and means for rotating said multicolor filter disc synchronously with a transmitted signal for providing the proper relation of the same with the color transmission.

2. In a combination monochromatic and color television system in which the color television transmission has vertical and horizontal sweep frequencies differing from those of monochromatic television transmission, a cathode ray television tube, a condensing and projecting lens system positioned to condense the image appearing on the face of the tube and to enlarge the condensed image, a multicolor filter disc, a motor for driving the same, a source of power having a frequency synchronized with said vertical color sweep frequency and means controlled by the horizontal color sweep frequency for closing a circuit to said source of power and for moving said filter disc into a position with relation to said lens where the image from the television tube has an area substantially smaller than on the face of the television tube.

3. In a combination monochromatic and color television system in which the color television transmission has vertical and horizontal sweep frequencies differing from those of monochromatic television transmission, a cathode ray television tube, a condensing and projecting lens system positioned to condense the image appearing on the face of the tube and to enlarge the condensed image, a multicolor filter disc, a motor for driving the same, a source of power having a frequency synchronized with said vertical color sweep frequency and means controlled by the horizontal color sweep frequency closing a plurality of circuits including a circuit controlling the tuning of the horizontal sweep frequency as applied to said television tube, a circuit controlling the tuning of the vertical sweep frequency as applied to said television tube and a circuit for closing a circuit to said source of power and for moving said filter disc into a position with relation to said lens where the image from the television tube has an area substantially smaller than on the face of the television tube.

4. In a combination monochromatic and color television system in which the color television transmission has vertical and horizontal sweep frequencies differing from those of monochromatic television transmission, a cathode ray television tube, a condensing and projecting lens system positioned to condense the image appearing on the face of the tube and to enlarge the condensed image, a multicolor filter disc, a motor for driving the same, a source of power having a frequency synchronized with said vertical color sweep frequency and means controlled by the horizontal color sweep frequency for closing a circuit to said source of power and for moving said filter disc into a position with relation to said lens where the image from the television tube has an area substantially smaller than on the face of the television tube, including means pivotally mounting said motor in an axis parallel to the axis of rotation of said color disc, a solenoid having a plunger connected to said means pivotally mounting said motor, relay means for energizing said solenoid through a power source, and tuned amplifying means operated by said horizontal color sweep frequency for operating said relay.

5. In a combination monochromatic and color television system, a cathode ray television tube, a condensing and projecting lens system positioned to condense the image appearing on the face of the tube and to enlarge the condensed image, said lens system having a slot extending in a plane transverse to the lens in the region of the focus, a multicolor filter disc engaging said slot to intercept the image passing through the lens, means for moving the disc to a position on said lens where the image from said television tube has an area substantially smaller than on the face of the television tube, and means for rotating said multicolor filter disc synchronously with a transmitted signal for providing the proper relation of the same with the color transmission.

6. In a combination monochromatic and color television system in which the color television transmission has vertical and horizontal sweep frequencies differing from those of monochromatic television transmission, a cathode ray television tube, a condensing and projecting lens system positioned to condense the image appearing on the face of the tube and to enlarge the condensed image, a multicolor filter disc, a motor for driving the same, a source of power having a frequency synchronized with said vertical color sweep frequency and means controlled by the horizontal color sweep frequency for closing a circuit to said source of power and for moving said filter disc into a position with relation to said lens where the image from the television tube has an area substantially smaller than on the face of the television tube, including a pivoted lever having said motor mounted on the end with the pivoting parallel to the axis of rotation of said color disc, and electrical means operatively controlled by said horizontal color sweep frequency for moving said pivoted lever to shift said color disc in its color television operating position.

References Cited in the file of this patent

UNITED STATES PATENTS

| | | |
|---|---|---|
| 2,295,443 | Wilson | Sept. 8, 1942 |
| 2,313,224 | Cawein | Mar. 9, 1943 |